(12) United States Patent
Rodman et al.

(10) Patent No.: US 8,930,594 B1
(45) Date of Patent: Jan. 6, 2015

(54) INTEGRATED CIRCUIT WITH A PINMUX CROSSBAR AND VIRTUAL PINS FOR PERIPHERAL CONNECTIVITY

(71) Applicant: Google Inc., Mountain View, CA (US)

(72) Inventors: Paul Kingsley Rodman, Palo Alto, CA (US); Donald Charles Stark, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/963,367

(22) Filed: Aug. 9, 2013

(51) Int. Cl.
*G06F 3/00* (2006.01)
*G06F 5/00* (2006.01)
*G06F 13/38* (2006.01)
*G06F 13/10* (2006.01)

(52) U.S. Cl.
CPC .................................... *G06F 13/102* (2013.01)
USPC .................................. 710/51; 710/16; 710/38

(58) Field of Classification Search
None
See application file for complete search history.

(56) References Cited

U.S. PATENT DOCUMENTS

| 5,847,578 A | 12/1998 | Noakes et al. |
| 2011/0289469 A1 | 11/2011 | Huang et al. |
| 2013/0111099 A1 | 5/2013 | Nie et al. |

FOREIGN PATENT DOCUMENTS

WO 01/71490 9/2001

*Primary Examiner* — Zachary K Huson
(74) *Attorney, Agent, or Firm* — Morris & Kamlay LLP (57) ABSTRACT

Described is an integrated circuit (IC) that allows for communication between any input/output (I/O) pin and onboard peripherals. Accordingly, the resultant IC can be easily documented and connections between I/O pins and peripherals can be managed for each peripheral independently. The IC may include one or more sets of hardwired connections that provide a connection between of any I/O pin and any onboard peripheral. The hardwired connections may include the use of one or more crossbars. This increases the overall functionality and potential applications for an IC as the only limitation on peripheral connectivity is the number of I/O pins.

17 Claims, 6 Drawing Sheets

INTEGRATED CIRCUIT WITH A PINMUX CROSSBAR AND VIRTUAL PINS FOR PERIPHERAL CONNECTIVITY

BACKGROUND

An integrated circuit (IC) that integrates all components of a computer or other electronic system into a single chip substrate is often referred to as a system on a chip or "system on chip" (SOC). Often such ICs include a number of onboard peripheral devices to accommodate a wide variety of potential applications. To reduce costs, the IC may have a limited number of input/output (I/O) pins to connect to the peripherals and the IC may employ multiplexing techniques to control the routing of signals within the circuit. The multiplexing logic may include an assortment of preconfigured settings, but not all combinations of peripherals may be available due to routing conflicts. Accordingly, these preconfigured settings only estimate the potentially useful combinations, and therefore, limit the overall flexibility and applicability of the IC. In addition, the configuration options and potential conflicts must be accounted for and adequately documented. This provides a certain degree of complexity and further increases burdens on compatibility requirements for subsequent IC releases.

BRIEF SUMMARY

In an implementation, described is a custom integrated circuit providing communication between any input/output (I/O) pin and onboard peripherals. The integrated circuit may include a plurality of onboard peripherals, a plurality of I/O pins, an input multiplexer for each input of the peripherals, and an output multiplexer for each of the I/O pins. Each of the peripherals may include an input and an output, and the I/O pins may include a set of physical I/O pins and a set of non-physical virtual I/O pins. Each of the physical I/O pins may be configured to provide an external connection to each of the peripherals and each of the non-physical virtual I/O pins may be configured to provide an internal connection between each of the peripherals and at least one of the other peripherals. The input multiplexer may be connected to the input of a corresponding one of the peripherals and configured to communicate a signal from at least one of the I/O pins to the connected corresponding peripheral. The output multiplexer may be connected to a corresponding one of the I/O pins and configured to communicate a signal from at least one of the outputs of the peripherals to the connected corresponding I/O pin. In addition, the integrated circuit may be configured to include a first set of hardwired connections from each of the I/O pins to each input multiplexer and a second set of hardwired connections from each output of the peripherals to each output multiplexer. The first set of hardwired connections may include a first crossbar and a dedicated hardwired connection between each of the I/O pins and the first crossbar. The second set of hardwired connections may include a second crossbar and a dedicated hardwired connection between each output of the peripherals and the second crossbar. In addition, the first set of hardwired connections and the second set of hardwired connections together may provide a hardwired connection between each of the peripherals.

In an implementation, described is a method of communicating on a custom integrated circuit including a plurality of I/O pins and a plurality of peripherals. The method may include transmitting a first signal from a first I/O pin to a first input multiplexer through a first set of hardwired connections. The first input multiplexer may be directed to communicate the first signal to an input of a specified first peripheral. The method may also include performing, by the specified first peripheral, a function based on the communicated first signal. The integrated circuit may be configured to include an input multiplexer for each input of the plurality of peripherals and the first set of hardwired connections may include connections from each of the plurality of I/O pins to each input multiplexer. In addition, the method may include transmitting a second signal from an output of the first peripheral to a first output multiplexer through a second set of hardwired connections. The output multiplexer may be directed to communicate the second signal to a second I/O pin. The integrated circuit may also be configured to include an output multiplexer for each of the I/O pins and the second set of hardwired connections may include a connection from each output of the plurality of peripherals to each output multiplexer. In addition, the first set of hardwired connections may include a first crossbar and a dedicated hardwired connection between each of the I/O pins and the first crossbar. The method may also include transmitting the second signal from the second I/O pin to a second input multiplexer through the first set of hardwired connections. The second input multiplexer may be directed to communicate the second signal to an input of a specified second peripheral. In addition, the second I/O pin may include a virtual pin.

In an implementation, described is a custom integrated circuit providing communication between any input/output (I/O) pin and onboard peripherals. The integrated circuit may include a plurality of onboard peripherals, a plurality of I/O pins, an input multiplexer for each input of the peripherals, and an output multiplexer for each of the I/O pins. Each of the peripherals may include an input and an output and the I/O pins may include a set of non-physical virtual I/O pins configured to provide an internal connection between each peripheral and at least one other peripheral through a hardwired crossbar. The input multiplexer may be connected to the input of a corresponding one of the peripherals and configured to communicate a signal from at least one of the I/O pins to the connected corresponding peripheral. The output multiplexer may be connected to a corresponding one of the I/O pins and configured to communicate a signal from at least one of the outputs of the peripherals to the connected corresponding I/O pin. In addition, the hardwired crossbar may provide a hardwired connection from each of the I/O pins to each input multiplexer. The hardwired connection from each of the I/O pins to each input multiplexer may also include a dedicated hardwired connection from each of the I/O pins to the crossbar. In addition, the hardwired crossbar may provide a hardwired connection from each output of the peripherals to each output multiplexer. The hardwired connection from each output of the peripherals to each output multiplexer may include a dedicated hardwired connection from each of the outputs of the peripherals to the crossbar. In addition, the hardwired crossbar may provide a hardwired connection between each of the peripherals.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fun

DETAILED DESCRIPTION

Described is an integrated circuit (IC) that provides the ability to communicate between any input/output (I/O) pin and any onboard peripheral. Accordingly, the resultant IC can be easily documented and connections between I/O pins and peripherals can be managed for each peripheral independently. Users are now provided with a greater degree of flexibility when deciding which peripherals to utilize for a particular application. This increases the overall functionality and potential applications for an IC as the only limitation on peripheral connectivity is the number of I/O pins. Moreover, subsequent IC releases may not be hindered with backwards compatibility issues from potential conflicts as any I/O pin may be connected to any peripheral.

To configure the routing of internal signals, ICs may implement pin multiplexing (or "pin muxing") techniques. Pin multiplexing is a technique that allows a component to select one of several input signals and outputs the selected input into a single line. The multiplexing logic used to multiplex the various signals may be configured with a pinmux tool. Pin multiplexing provides a degree of flexibility when configuring peripheral usage, but introduces extra logic susceptible to improper functionality. Prior systems often include preconfigured pinmux settings to reduce these potential peripheral conflicts. These preconfigurations estimate which peripherals a user may require for a given application. For example, one preconfiguration setting may provide access to Universal Asynchronous Receiver/Transmitter (UART), I²C, and Serial Peripheral Interface (SPI) pins, but only a few of the General Purpose Input/Output (GPIO) pins. As described, these preconfigurations only estimate potentially useful combinations, and therefore, limit potentially useful applications for the IC.

In an implementation, described is an IC with one or more sets of hardwired connections that provide a connection between of any I/O pin and any onboard peripheral. The hardwired connections may include the use of one or more crossbars. To allow for these additional interconnections, the IC includes additional area on the IC substrate. The inclusion of an additional silicon area provides a cost effective approach to increase the connectivity of an IC because the price of silicon is becoming more affordable at a faster rate than the cost of I/O pins. In implementations, an IC may also employ virtual I/O pins to provide interconnectivity between peripherals, and in certain implementations, provide the ability for any peripheral to communicate with any other peripheral. In order to provide this increased connectivity, the IC may include a multiplexer for each onboard peripheral input and a multiplexer for each I/O pin. Accordingly, in implementations, a signal may be sent from any I/O pin to any peripheral and from any peripheral to any I/O pin. Therefore, the only constraint for connectivity in the system is the physical pin limitations rather than peripheral availability due to routing conflicts.

There are numerous types of integrated circuits. One type includes programmable logic devices (PLDs) including field programmable gate arrays (FPGAs). FPGAs are programmed by the end user using special-purpose equipment. Programmable logic devices, however, may be undesirable for many applications because they operate at relatively slow speeds and have relatively low capacity. In addition, FGPAs may have a relatively high cost per device.

Another type of integrated circuit includes a semi-custom application-specific integrated circuit (ASIC), such as gate-array based and cell-based ASICs. Semi-custom ASICs are programmed by either defining the placement and interconnection of a collection of predefined logic cells which are used to create a mask for manufacturing the IC (cell-based) or defining the final metal interconnection layers to lay over a predefined pattern of transistors on the silicon (gate-array-based). Semi-custom ASICs improve on some of the disadvantages of a FGPA, but do not provide the efficiency potential of a full-custom integrated ASIC.

The implementations of ICs described herein, relate to full-custom ASICs. In a full-custom integrated circuit all the photolithographic layers of the device are typically defined. The benefits of full-custom design usually include more efficient use of area, performance improvements, and also the ability to integrate components and other pre-designed and typically verified components, such as processor cores that form a SOC.

Figure 1:
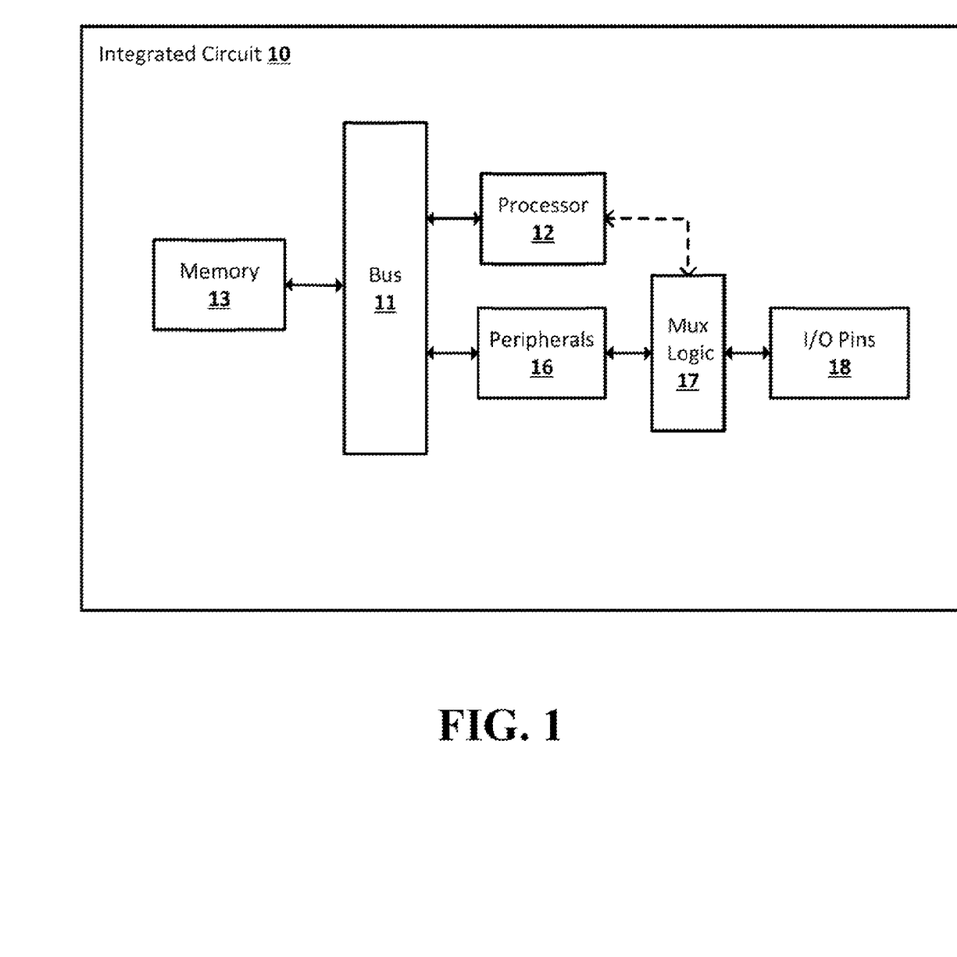
- FIG. 1 illustrates an example block diagram of an integrated circuit according to an implementation of the disclosed subject matter.

FIG. 1 illustrates an example integrated circuit 10 according to an implementation of the disclosed subject matter. The IC 10 may include one or more processors 12, memory 13, peripherals 16, multiplex logic 17, and the IC 10 may be coupled to one or more input/output (I/O) pins 18. These components may be interconnected by way of a bus 11. The functions performed by the IC 10 may include a variety of desired functions.

The processor 12 may execute instructions stored in memory 13 to perform the various functions designed for the IC 10. The processor 12 may include a multifunction processor and/or an application specific processor that is operationally connected to the memory 13. The memory 13 may include any suitable non-volatile memory such as electrically erasable programmable read only memory (EEPROM) or flash memory and any suitable volatile memory such as random access memory (RAM). System instructions and other pre-programmed computer readable instructions are typically stored in the non-volatile memory while data generated and used during operation of the IC is typically stored in the volatile memory. Although the processor 12 and memory 13 are depicted as separate units, in some instances, the processor 12 and memory 13 may be integrated onto the same device and typically the processor 12 will include some on-chip memory.

The IC 10 may include a number of onboard peripherals 16 for performing various functions in a particular application. Each of the peripherals 16 may include one or more inputs and one or more outputs for providing connectivity. The peripherals 16 may include various types of components such as a Universal Asynchronous Receiver/Transmitter (UART), Serial Peripheral Interface (SPI), Inter-Integrated Circuit (I²C), Pulse-Width Modulator (PWM), Analog-to-Digital Converter (ADC), a General Purpose Input/Output (GPIO) peripheral, among other types of components.

When the IC 10 receives information from an external source, the IC 10 converts the inputted electrical signals to a digital signal through suitable signal processing circuitry. The signal, which is generated by the IC 10, is then provided to the corresponding components on the IC 10 (e.g. peripherals 16).

The IC 10 may include multiplex logic 17 for routing and multiplexing signals between the I/O pins 18 and peripherals 16. The multiplex logic 17 may include multiplexers or other suitable types of data selectors. These multiplexers may be configured to include N number of select lines, which are used to select which input lines to include in the output. In implementations, the number of select lines may correspond to the number of peripheral inputs and/or the number of I/O pins 18. For example, an IC implementation with six peripheral inputs and four I/O pins may include six multiplexers (one for each peripheral input) each with four select lines (one for each I/O pin), or put another way, six 4-to-1 multiplexers.

The multiplex logic 17 may include a plurality of data paths each electrically connected to the peripherals 16. These data paths may be pre-defined and the data-flow of the data paths may be determined by the processor 12. The multiplex logic 17 may include various hardwired connections. The hardwired connections may include the use of one or more physical crossbars (also referred to as "matrix") and may include non-blocking connections. These non-blocking connections allow concurrent connections to any arbitrary input of the crossbar to any arbitrary output of the crossbar. The hardwired connection may also be dedicated to a particular source or destination. For example, a dedicated hardwired connection may exist between an I/O pin and a multiplexer, an I/O pin and a crossbar, a peripheral and a crossbar, and a peripheral and a multiplexer, among others.

The multiplex logic 17 may include assigning an input multiplexer to each peripheral input and providing a hardwired connection from each I/O pin 18 to each input multiplexer. Accordingly, this configuration can prevent routing conflicts as every I/O pin 18 may be connected to every one of the peripherals 16. When routing signals, the I/O pins 18 may transmit one or more signals as input to the peripherals 16 via the multiplex logic 17 and the processor 12 may instruct the multiplex logic 17 to direct which signals are to be routed to specific peripherals 16.

The peripherals 16 may also receive one or more signals from, for example, the processor 12 for transmission to one or more of the I/O pins 18. The multiplexer logic 17 may include assigning an output multiplexer to each I/O pin 18 and providing a hardwired connection from each peripheral output to each output multiplexer. When routing signals, the peripheral outputs may transmit one or more signals as input to the I/O pins 18 via the multiplex logic 17 and the processor 12 may instruct the multiplex logic 17 to direct which signals are to be routed to specific I/O pins 18.

The I/O pins 18 may include various forms including packages that utilize pads. For example, the I/O pins may include flat no-leads packages such as quad-flat no-leads (QFN), dual flat no-lead package (DFN), and other suitable types of packages. The I/O pins 18 may include various sizes and thickness.

The IC 10 substrate may be formed from various materials. For example, the IC 10 may include one or more layers of single-crystal silicon as the substrate. In other examples, the substrate may be germanium, silicon on insulator (SOI) such as silicon dioxide ($SiO_2$) based SOI and silicon on sapphire, compound semiconductors such as gallium arsenide (GaAs) and Gallium nitride (GaN), organic semiconductor materials, or one or more other suitable semiconductor materials.

Figure 2:
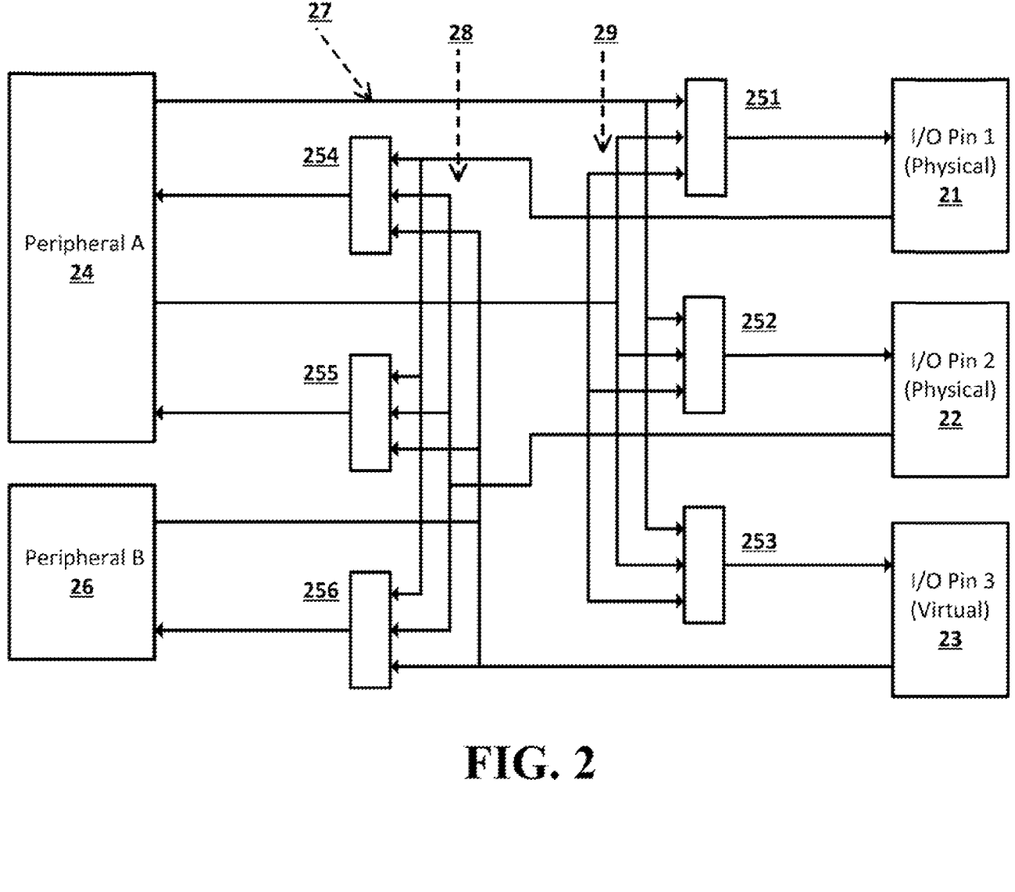
FIG. 2 illustrates an example of multiplex logic according to an implementation of the disclosed subject matter.

FIG. 2 illustrates an example of multiplex logic according to an implementation of the disclosed subject matter. The example of FIG. 2 includes a portion of an IC 10 including three I/O pins 18, two peripherals 16, and six multiplexers (shown as multiplexers 251-256). The IC 10 may interconnect these components through hardwired connections 27, and these connections may include one or more crossbars. For example, as shown in FIG. 2, a first crossbar 28 and a second crossbar 29 may be included. The multiplexers allow arbitrary connection between onboard peripherals and the I/O pins 18. In this example, the I/O pins 18 include a set of digital pins 21, 22, and 23. These may include one or more physical pins that provide an external connection to the circuit and may include one or more virtual pins that provide an internal connection between peripherals. For example, pins 21 and 22 may be physical pins and pin 23 may be a virtual pin.

In this example, there are two peripherals 16 including peripheral A 24 and peripheral B 26. For example, peripheral A 24 may be an $I^2C$ peripheral and peripheral B may be a UART peripheral. The peripherals 16 and I/O pins 18 are separated by a series of multiplexers that may be configured using selection registers. For signals (e.g. data) going to a peripheral, there is a multiplexer selecting a designated pin to drive the peripheral input. As described herein, these multiplexers may be referred to as input multiplexers (e.g. multiplexers 254, 255, and 256). For signals going to a pin, there is a multiplexer that selects between all the possible peripheral outputs. As described herein, these multiplexers may be referred to as output multiplexers (e.g. multiplexers 251, 252, and 253).

The IC may control the multiplexers in each direction using a pinmux selection instruction. For example, if a user requires the UART peripheral (e.g. peripheral B) output signal be provided to I/O pin 21, and the user wants I/O pin 22 to drive the UART input, the processor 12 may provide the selection registers for multiplexer 251 and multiplexer 256 with the appropriate selector values. In another example, connecting the $I^2C$ peripheral (e.g. peripheral A) to I/O pin 21 and I/O pin 22 would require, for example, four register writes as the $I^2C$ protocol may be bidirectional. Accordingly, the processor 12 may provide the selection registers for multiplexers 251, 252, 254, and 255 with the appropriate selector values. Other peripherals 16 may be connected in a similar manner. The pins can be left unselected for peripherals 16 in which pin selection is optional. Unselected pin outputs may be tristated, and unselected peripheral inputs may be set to 0. An I/O pin 18 may provide signals to more than one of the peripherals 16 and the output signals of a peripheral may be routed to more than one I/O pin 18. Accordingly, a signal may be sent from any I/O pin to multiple peripherals or from any peripheral to multiple I/O pins. For example, this is may be useful if two different peripherals respond to the same external stimulus, or if a fanout constraint requires that external loading be distributed across two I/O pins rather than one I/O pin.

In an implementation, one or more of the I/O pins may include a virtual pin. For example, as shown I/O pin 23 may include a virtual pin. The virtual pin may not be connected to a physical pin (e.g. pad) on the package. The virtual pin may, however, provide the ability to allow peripherals to communicate internally with one another via the multiplexers. The virtual pin may be documented as a regular "package" pin while remaining as an internal pin. Accordingly, this may reduce complexity by providing the ability to reference all of the pins in a similar manner. The virtual pin may include inputs logic zero and logic one (e.g. 0 when not in use and 1 when "on"). When communicating with other peripherals, a peripheral output signal may be fed back as input to another peripheral via, in this example, virtual I/O pin 23. For example, a peripheral A 24 output signal may be transmitted to I/O pin 23 via multiplexer 253 and then fed back as input into the input of peripheral B 26 via multiplexer 256.

Figure 3:
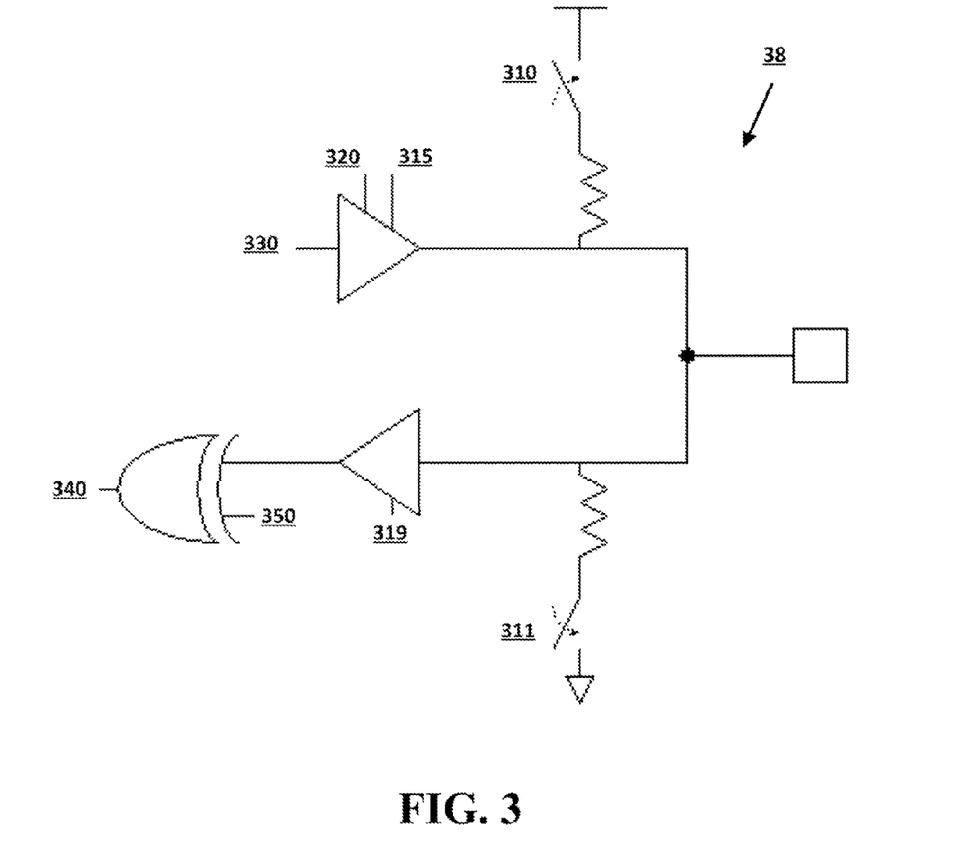
FIG. 3 illustrates an example of pin control logic according to an implementation of the disclosed subject matter.

FIG. 3 illustrates a simplified example of pin control logic according to an implementation of the disclosed subject matter. The I/O pin 18 described herein may include digital pins as shown in FIG. 2. The digital pins may include controls for integrated pullups and pulldowns, programmable drive strength, and programmable inversion. In an implementation, the pin control logic may include controls such as a pullup 310 and a pulldown 311 function. For example, the pullup 310 may enable an integrated pullup resistor and the pulldown 311 may enable an integrated pulldown resistor. A drive strength 315 control may be included to change the output driver strength and an input enable 319 command may enable a Schmitt trigger and a pad input path. This input may be enabled whenever a pad is used for a digital function and disabled when the pad is used as an analog function. An output enable 320 command may activate the output driver and this signal may be driven by a peripheral via one or more multiplexers. An output data 330 control may drive data when the output enable is active. This signal may also be driven by a peripheral via one or more multiplexers. Input data 340 may include data from the pad (e.g. I/O pin) and this signal may only be valid when the input enable is asserted. In addition, the invert 350 control may invert the data coming to/from the pad.

Figure 4:
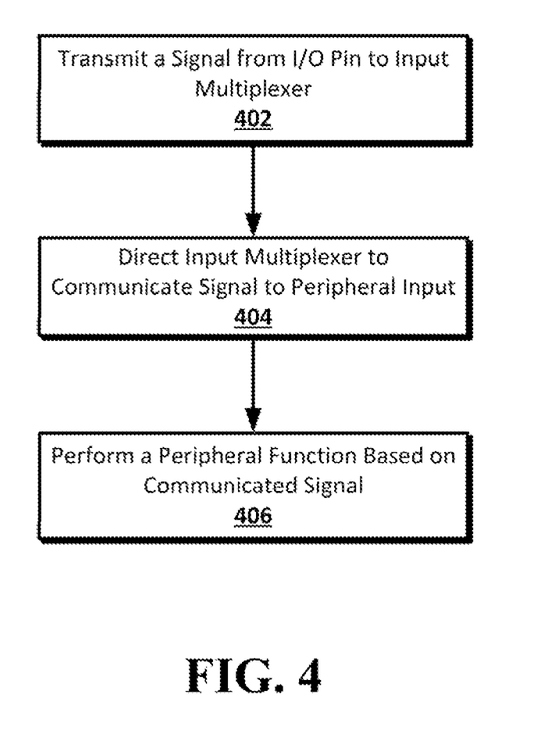
FIG. 4 illustrates an example flow diagram of transmitting a signal from an I/O pin to a peripheral according to an implementation of the disclosed subject matter.

FIG. 4 illustrates an example flow diagram of transmitting a signal from an I/O pin to a peripheral according to an implementation of the disclosed subject matter. In 402, the IC 10 may transmit a first signal from a first I/O pin to a first input multiplexer. This signal may be sent through a first set of hardwired connections. The first set of hardwired connection may utilize a crossbar for routing the connections (e.g. crossbar 28 as shown in FIG. 2). In implementations, the hardwired connections may include dedicated hardwired connections as described above. The hardwired connections may be dedicated to a particular I/O pin. For example, the dedicated hardwired connection may include a connection between each I/O pin and each input multiplexer, or each I/O pin and a crossbar. In such a configuration, particular signal paths along the hardwired connection or a crossbar may be utilized only by a particular I/O pin.

In 404, a processor 12 may direct (e.g. based on an instruction) the first input multiplexer to communicate the first signal to an input of one or more peripherals. For example, a selection register of a multiplexer may be assigned a particular value in order to appropriately route signals to a particular peripheral input. This may include one signal from one I/O pin 18 or multiple signals from multiple I/O pins 18. In cases where there are multiple signals, the multiplexer may employ pin naming techniques to provide peripheral input. In 406, a peripheral may perform one or more functions based on the communicated signal.

Figure 5:
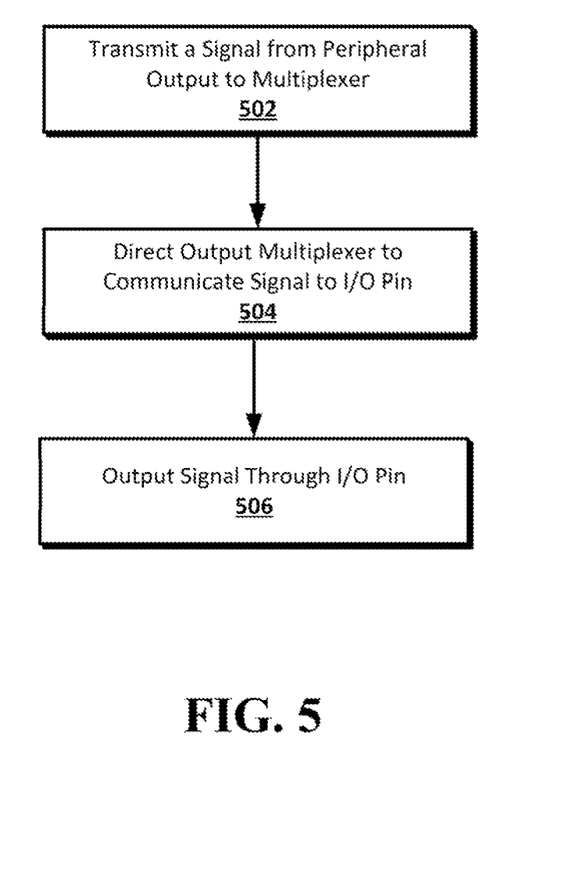
FIG. 5 illustrates an example flow diagram of transmitting a signal from a peripheral to an I/O pin according to an implementation of the disclosed subject matter.

FIG. 5 illustrates an example flow diagram of transmitting a signal from a peripheral to an I/O pin according to an implementation of the disclosed subject matter. In addition to transmitting a signal from I/O pins to a peripheral, the I/O pins may also receive a signal from a peripheral output. In 502, the IC 10 may transmit a signal from an output of a first peripheral to a first output multiplexer through a second set of hardwired connections (e.g. crossbar 29 as shown in FIG. 2). As described above, the hardwired connections may include dedicated connections. The hardwired connections may be dedicated to a particular peripheral output. For example, the dedicated hardwired connection may include a connection between each peripheral output to each output multiplexer, or each peripheral output and a crossbar. In such a configuration, particular signal paths along the hardwired connection or a crossbar may be utilized only by a particular peripheral output. In 504, the processor 12 may direct the output multiplexer to communicate the signal to an I/O pin. In 506, the signal may be outputted through the I/O pin. For example, the signal may be outputted to an external device (e.g. device connected to the I/O pin).

Figure 6:
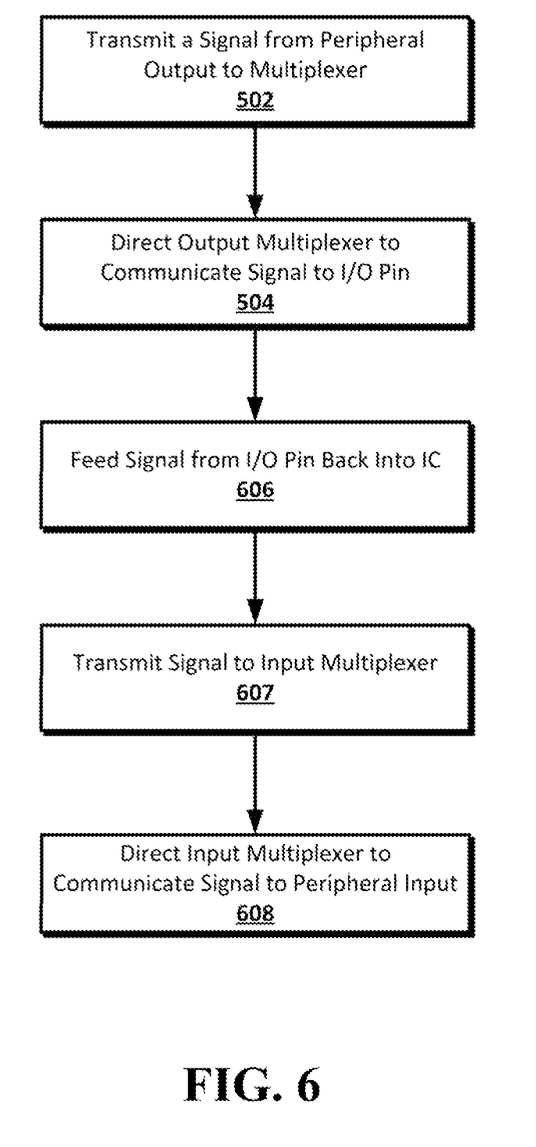
FIG. 6 illustrates an example flow diagram of transmitting a signal from a peripheral to another peripheral according to an implementation of the disclosed subject matter.

FIG. 6 illustrates an example flow diagram of transmitting a signal from a peripheral to another peripheral according to an implementation of the disclosed subject matter. As described above, in 502, the IC 10 may transmit a signal from an output of a first peripheral to a first output multiplexer through a set of hardwired connections. In 504, the processor 12 may direct the output multiplexer to communicate the signal to a second I/O pin. In 606, the second I/O pin may feed the signal back into the IC 10 through one or more virtual pins. Accordingly, in 607, the IC may transmit a second signal from a second I/O pin to a second input multiplexer in a similar manner as described above in 402. In 608, the processor 12 may direct a second input multiplexer to communicate the second signal to an input of one or more peripherals. Accordingly, a peripheral may communicate with other peripherals when the second I/O pin acts as a virtual pin. In such situations, a crossbar may provide a hardwired connection between each of the peripherals.

The flow diagrams described herein are included as examples. There may be variations to these diagrams or the steps (or operations) described therein without departing from the implementations described herein. For instance, the steps may be performed in parallel, simultaneously, a differing order, or steps may be added, deleted, or modified. Similarly, the block diagrams described herein are included as examples and these configurations are not exhaustive of all the components and there may be variations to these diagrams. Other arrangements and components may be used without departing from the implementations described herein. For instance, components may be added, omitted, and may interact in various ways known to a person skilled in the art.

References to "one implementation," "an implementation," "an example implementation," and the like, indicate that the implementation described may include a particular step, feature, structure, or characteristic, but every implementation may not necessarily include the particular step, feature, structure, or characteristic. Moreover, such phrases are not necessarily referring to the same implementation. Further, when a particular step, feature, structure, or characteristic is described in connection with an implementation, such step, feature, structure, or characteristic may be included in other implementations whether or not explicitly described. The term "substantially" may be used herein and may be interpreted as "as nearly as practicable," "within technical limitations," and the like.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A custom integrated circuit providing communication between any input/output (I/O) pin and onboard peripherals, comprising:
    a plurality of onboard peripherals, each of the peripherals including an input and an output;
    a plurality of I/O pins, the I/O pins including a set of physical I/O pins and a set of non-physical virtual I/O pins, each of the physical I/O pins configured to provide an external connection to each of the peripherals and each of the non-physical virtual I/O pins configured to provide an internal connection between each of the peripherals and at least one of the other peripherals;
    an input multiplexer for each input of the peripherals, the input multiplexer connected to the input of a corresponding one of the peripherals and configured to communicate a signal from at least one of the I/O pins to the connected corresponding peripheral; and
    an output multiplexer for each of the I/O pins, the output multiplexer connected to a corresponding one of the I/O pins and configured to communicate a signal from at least one of the outputs of the peripherals to the connected corresponding I/O pin, wherein
    the integrated circuit is configured to include a first set of hardwired connections from each of the I/O pins to each input multiplexer and a second set of hardwired connections from each output of the peripherals to each output multiplexer.

2. The integrated circuit of claim 1, wherein the first set of hardwired connections and the second set of hardwired connections together provide a hardwired connection between each of the peripherals.

3. The integrated circuit of claim 1, wherein the first set of hardwired connections includes a first crossbar.

4. The integrated circuit of claim 3, wherein the first set of hardwired connections includes a dedicated hardwired connection between each of the I/O pins and the first crossbar.

5. The integrated circuit of claim 1, wherein the second set of hardwired connections includes a second crossbar.

6. The integrated circuit of claim 5, wherein the second set of hardwired connections includes a dedicated hardwired connection between each output of the peripherals and the second crossbar.

7. A method of communicating on a custom integrated circuit including a plurality of I/O pins and a plurality of peripherals, comprising:
    transmitting a first signal from a first I/O pin to a first input multiplexer through a first set of hardwired connections;
    directing the first input multiplexer to communicate the first signal to an input of a specified first peripheral; and
    performing, by the specified first peripheral, a function based on the communicated first signal, wherein the integrated circuit is configured to include an input multiplexer for each input of the plurality of peripherals and the first set of hardwired connections includes connections from each of the plurality of I/O pins to each input multiplexer.

8. The method of claim 7, wherein the first set of hardwired connections includes a first crossbar and a dedicated hardwired connection between each of the I/O pins and the first crossbar.

9. The method of claim 7, further comprising:
    transmitting a second signal from an output of the first peripheral to a first output multiplexer through a second set of hardwired connections; and
    directing the output multiplexer to communicate the second signal to a second I/O pin, wherein the integrated circuit is configured to include an output multiplexer for each of the I/O pins and the second set of hardwired connections includes a connection from each output of the plurality of peripherals to each output multiplexer.

10. The method of claim 9, wherein the second set of hardwired connections includes a second crossbar and a dedicated hardwired connection between each of the peripheral outputs and the second crossbar.

11. The method of claim 9, further comprising:
    transmitting the second signal from the second I/O pin to a second input multiplexer through the first set of hardwired connections; and
    directing the second input multiplexer to communicate the second signal to an input of a specified second peripheral.

12. The method of claim 11, wherein the second I/O pin is a virtual pin.

13. A custom integrated circuit providing communication between any input/output (I/O) pin and onboard peripherals, comprising:
    a plurality of onboard peripherals, each of the peripherals including an input and an output;
    a plurality of I/O pins, the I/O pins including a set of non-physical virtual I/O pins configured to provide an internal connection between each peripheral and at least one other peripheral through a hardwired crossbar;
    an input multiplexer for each input of the peripherals, the input multiplexer connected to the input of a corresponding one of the peripherals and configured to communicate a signal from at least one of the I/O pins to the connected corresponding peripheral; and
    an output multiplexer for each of the I/O pins, the output multiplexer connected to a corresponding one of the I/O pins and configured to communicate a signal from at least one of the outputs of the peripherals to the connected corresponding I/O pin, wherein
    the hardwired crossbar provides a hardwired connection from each of the I/O pins to each input multiplexer.

14. The integrated circuit of claim 13, wherein the hardwired connection from each of the I/O pins to each input multiplexer includes a dedicated hardwired connection from each of the I/O pins to the crossbar.

15. The integrated circuit of claim 13, wherein the hardwired crossbar provides a hardwired connection from each output of the peripherals to each output multiplexer.

16. The integrated circuit of claim 15, wherein the hardwired connection from each output of the peripherals to each output multiplexer includes a dedicated hardwired connection from each of the outputs of the peripherals to the crossbar.

17. The integrated circuit of claim 13, wherein the hardwired crossbar provides a hardwired connection between each of the peripherals.

* * * * *